United States Patent Office 3,584,045
Patented June 8, 1971

3,584,045
CYCLOALIPHATIC DI(AMINOALKANES)
Julian Feldman, Cincinnati, Orville D. Frampton, Wyoming, and Imre A. Keresztes, Reading, Ohio, assignors to National Distillers and Chemical Corporation, New York, N.Y.
No Drawing. Continuation-in-part of application Ser. No. 617,042, Feb. 20, 1967. This application Dec. 28, 1967, Ser. No. 694,073
Int. Cl. C07c 87/38, 87/40; C08g 22/18
U.S. Cl. 260—563
4 Claims

ABSTRACT OF THE DISCLOSURE

Cycloaliphatic di(aminoalkanes) such as 1 - aminomethyl - 1 - (3 - aminopropyl) cyclohexane; bicyclo [2.2.1]-2-aminomethyl - 2 - (3 - aminopropyl)-heptane; bicyclo [4.3.0] - 2 - aminomethyl - 2 - (3 - aminopropyl)-nonane prepared by hydrogenating the corresponding unsaturated cycloaliphatic dinitriles and useful for the preparation of polyurethanes by conversion to the corresponding alkyl diisocyanates.

This application is a continuation-in-part of copending application Ser. No. 617,042, filed Feb. 20, 1967 now U.S. Pat. 3,515,740.

This invention relates to cycloaliphatic di(aminoalkanes) and, more particularly, to 1,1-di(aminoalkyl) cyclohexanes, 2,2 - di(aminoalkyl) bicycloalkanes and 2,2 - di(aminoalkyl tricycloalkanes and a process for preparing the same by reduction of the corresponding unsaturated cycloaliphatic dinitriles.

Generally, nitriles and dinitriles can be hydrogenated to the corresponding amines in the presence of ammonia and cobalt, copper, or nickel catalysts. For example, Winans and Adkins, J. Amer. Chem. Soc. 54 306 (1932), and U. S. Pat. No. 2,166,151 describe the reduction of open chain (aliphatic) nitriles to primary amines in the presence of anhydrous ammonia, and a nickel catalyst, at from 100 to 150° C. U.S. Pats. Nos. 3,166,596 and 3,260,752 to Miller et al. disclose the preparation of amines from olefinically unsaturated (open chain) nitriles by reacting under relatively mild conditions the nitrile, ammonia and hydrogen in the presence of a hydrogenation catalyst, such as nickel, cobalt, aluminum alloys, copper, and mixtures of the same. However, it has been found that the reduction of dinitriles in which the nitrile is a substituent on a cycloaliphatic ring, such as cyclohexene, does not usually proceed all the way to the diaminocyclohexanes, but stops at either the dicyano cyclohexane stage or the diamino cyclohexene stage. The difficulty is attributed to the isomerization of the double bond in the cyclohexene ring to a position which is extremely difficult to hydrogenate.

This invention provides a process for reducing ring-unsaturated cycloaliphatic dinitriles (such as can be formed by the Diels-Alder condensation of 1,3-dienes, such as 1,3-butadiene, or 1,3-cycloalkadienes, and 2-methylene aliphatic dinitriles, such as 2-methylene glutaronitrile) to form the corresponding ring-saturated cycloaliphatic di(aminoalkanes).

By the process of the invention, in combination with the Diels-Alder condensation, it is now possible to prepare cycloaliphatic di(aminoalkanes) of a complicated structure, difficult of access by other routes, starting with simple starting materials that are readily available, such as 1,3-dienes, and 2-methylene aliphatic dinitriles, which are also readily prepared by conventional processes. It is possible to prepare cycloaliphatic diamines having attached to the same carbon atom of the same cycloaliphatic ring both an aminomethyl group and an aminoalkyl group of any desired length, starting with the aminomethyl group. Moreover, it is possible to prepare bicyclo and tricyclo alkanes in which the endo carbon atom can have none or a variety of alkyl substituents, and having attached to the 2-carbon atom of the alkane ring an aminomethyl group and an aminoalkyl group of varied structure, starting with the aminomethyl group.

The cycloaliphatic di(aminoalkyls) in accordance with the instant invention contain two aminoalkyl groups on the same ring carbon of which one is an aminomethyl group, and includes 1,1-di(aminoalkyl) cyclohexanes, 2,2-di(aminoalkyl) bicycloalkanes, and 2,2-di(aminoalkyl) tricycloalkanes, each having a variety of substituents, and encompassed by the formula:

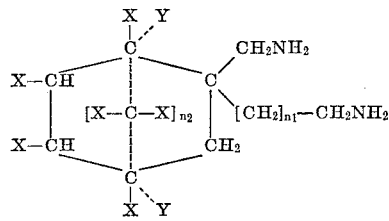
I

This formula encompasses both di(aminoalkyl) cyclohexanes and di(aminoalkyl) cyclohexanes containing condensed rings and bicyclo- and tricycloalkanes which are defined as follows:

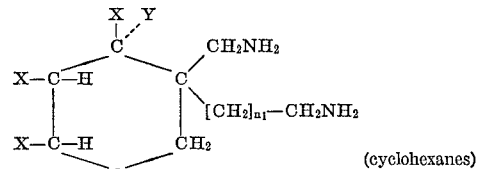
(cyclohexanes)
II

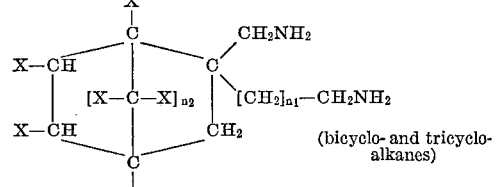
(bicyclo- and tricycloalkanes)
III

In the above formulae, X and Y can be the same or different, and are selected from the group consisting of hydrogen, halogen, alkyl having from about one to about twelve carbon atoms, alkylene having from about one to about twelve carbon atoms, alkoxy having from about one to about eight carbon atoms, and aryl having from about six to about twelve carbon atoms.

$n_1$ is an integer of one or two.

$n_2$ is an integer ranging from zero to about three and Y is present only when $n_2$ is zero. When $n_2$ is zero, the ring is cyclohexane, and when $n_2$ is one to three, the ring is a bicycloalkane.

Preferably, $n_1$ is two, $n_2$ is zero, and X and Y are hydrogen.

The X groups on adjacent carbon atoms in Formulae I, II and III can be interconnected by hydrocarbon, ether or ester bridges to form a variety of cycloaliphatic and heterocyclic ring compounds. Thus, for example, two X groups can be taken together as an alkyl group having from about three to about six carbon atoms, thereby forming a second or third cycloaliphatic ring as in indane or Tetralin, or as an oxyalkyl group having from about two to about five carbon atoms and one or two ether oxygens, thereby forming an oxygen-containing heterocyclic ring or an ester group having from about three to about six carbon atoms, thereby forming a lactone ring. Thus, for example, a five membered oxyheterocyclic ring can have one oxygen atom, a six membered oxyheterocyclic ring can have two oxygen atoms and a seven or eight membered oxyheterocyclic ring can have three oxygen atoms.

Typical alkyl groups include methyl, ethyl, propyl, isopropyl, n-butyl, isobutyl, tertiary butyl, secondary butyl, amyl, hexyl, isoamyl, isohexyl, tertiary hexyl, heptyl, isoheptyl, n-octyl, 2-ethylhexyl, isooctyl, nonyl, decyl, undecyl, and dodecyl.

Typical alkoxy groups include methoxy, ethoxy, butoxy, propoxy, amyloxy, hexoxy, heptoxy, octoxy, and decyloxy.

Typical alkylene groups include methylene, ethylene, 1,3-propylene, 1,2-propylene, 1,2-butylene, 1,3-butylene, 1,4-butylene, and like amylene, hexylene, heptylene, octylene and decylene radicals.

The halogen can be fluorine, bromine, chlorine, or iodine.

Typical aryl groups include phenyl, p-tolyl, o-tolyl, p-xylyl, and naphthyl.

Examples of 1,1-di(aminoalkyl) cyclohexanes in accordance with the invention, as represented by Formulae I and II, include, but are not limited to, 1-aminomethyl-1-(3-aminopropyl)cyclohexane;
1-aminomethyl-1-(2-aminoethyl)cyclohexane;
1-aminomethyl-1-(3-aminopropyl)-4-methyl cyclohexane;
1-aminomethyl-1-(3-aminopropyl)-3-methyl cyclohexane;
1-aminomethyl-1-(3-aminopropyl)-2-methoxy-cyclohexane; and
1-aminomethyl-1-(3-aminopropyl)-2,3,4,5-tetrachloro-cyclohexane.

Examples of 2,2-di(aminoalkyl) bicycloalkanes in accordance with the invention as represented by Formulae I and III include, but are not limited to, bicyclo[2.2.1]-2-aminomethyl-2-(3-aminopropyl)-heptane;
bicyclo[2.2.1]-2-aminomethyl-2-(3-aminopropyl)-7,7-dimethylheptane; and
bicyclo[2.2.1]-2-aminomethyl-2-(3-aminopropyl)-1,4,5,6,7,7-hexachloro-heptane.

Examples of cycloaliphatic diamines in accordance with the invention wherein two X groups are interconnected by hydrocarbon, ether or ester bridges include, but are not limited to, bicyclo[4.3.0]-2-aminomethyl-2-(3-aminopropyl)-nonane;
bicyclo[4.4.0]-2-aminomethyl-2-(3-aminopropyl)-decane;
tricyclo[2.2.1.3$^{6,5}$]-2-aminomethyl-2-(3-aminopropyl)-decane;
3-oxabicyclo[3.4.0]-8-aminomethyl-8-(3-aminopropyl)-nonane; and
3-oxatricyclo[3.4.0.1$^{1,7}$]-8-aminomethyl-8-(3-aminopropyl)-decane.

The process of the invention for preparing cycloaliphatic di(aminoalkanes) from corresponding ring-unsaturated cycloaliphatic dinitriles employing a hydrogenation or reduction technique comprises hydrogenating a ring-unsaturated cycloaliphatic dinitrile in the presence of a hydrogenation catalyst and liquid ammonia.

The hydrogenation of the ring-unsaturated cycloaliphatic dinitrile proceeds in accordance with the following equation:

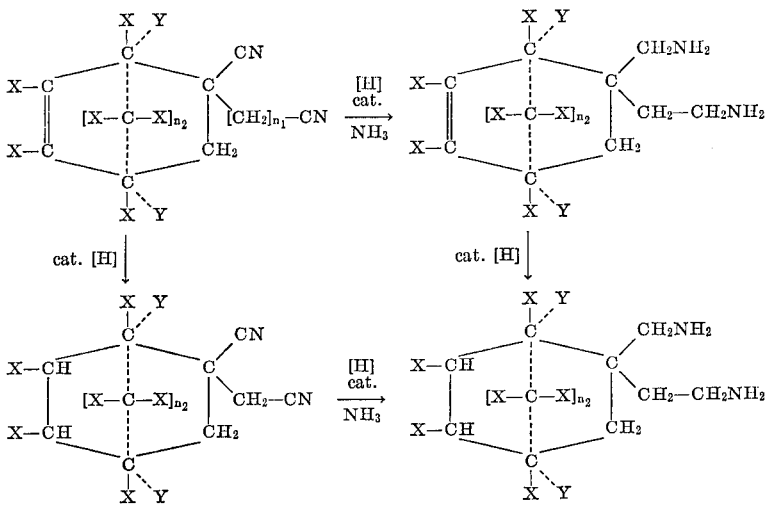

Both hydrogenation stages may occur in sequence or concurrently, depending on the catalyst employed. The reduction of the nitrile group to the amine group is carried out in the presence of hydrogen, ammonia, and the catalyst, and the reduction of the ring double bond requires only hydrogen and the catalyst.

The reduction of the nitrile group proceeds with nickel or cobalt, such as Raney nickel, Raney cobalt, nickel sponge, Ruffert nickel, electrolytic nickel or cobalt, reduced nickel or cobalt salts, etc. The reduction of the ring double bond proceeds with such conventional hydrogenation catalysts as nickel, palladium and platinum. Cobalt will, to some extent, reduce the ring double bond, however, the reduction of the nitrile groups apparently proceeds preferentially, and the reduction of the ring double bond is not usually complete.

The reduction of the nitrile groups and of the ring double bond is preferably carried out stepwise with the reduction of the nitrile groups as the first step. This first step preferably involves the hydrogenation of the nitrile groups in the presence of ammonia and a suitable catalyst such as cobalt or nickel. The second step preferably involves reduction of the ring double bond by hydrogenation in the presence of a suitable catalyst such as palladium or platinum. It is preferred to employ a stepwise procedure since complete reduction of the ring double bond is not obtained in a single step procedure. Reduction of the nitrile groups with a cobalt or nickel catalyst as an initial step is preferred since unwanted by-products such as condensed secondary and tertiary amines are found when reduction of the ring double bond employing a palladium or platinum catalyst is carried out first.

During the hydrogenation of the double bond of the ring unsaturated dinitrile or diamine, the double bond may isomerize, thereby preventing efficient hydrogenation thereof. Accordingly, special care must be exercised in the hydrogenation to suppress isomerization. This can be accomplished by vigorous agitation, at temperatures high enough to initiate hydrogenation of the double bond as will be seen hereinafter.

In a preferred embodiment of the process of the invention, the saturated or unsaturated dinitrile is dissolved in a suitable solvent prior to subjecting the dinitrile and/or ring-unsaturated diamine to hydrogenation to produce the corresponding ring-saturated diamine. The preferred solvent is an alcoholic solvent containing from about one to about five carbon atoms. Typical alcoholic solvents suitable for use herein include low molecular weight alcohols, such as ethanol, propanol, isopropanol, butanol, t-butanol, and amyl alcohol. The solvent can be employed in amounts within the range from about 0 to about 300% of the weight of the dinitrile, and preferably within the range from about 50 to about 100%.

The hydrogenation catalysts employed for hydrogenating the ring double bond in the dinitrile or diamine can be supported or unsupported.

The nickel or metallic cobalt catalyst employed in the hydrogenation of the nitrile to the diamine can be either skeletal, unsupported or deposited on an inert carrier, such as alumina, silica, zirconia, alundum, silicon carbide, barium sulfate, carbon, and the inorganic phosphates, silicates, aluminates, borates and carbonates stable under the reaction conditions to be encountered in the use of the catalyst.

The cobalt or nickel catalyst for nitrile reduction can be employed in the usual amounts for such a reaction, such as, for example, within the range from about 1 to about 50%, and preferably within the range from about 5 to about 30% of the weight of the nitrile to be reduced. If nickel is employed as the only catalyst, it can be employed in an amount within the range from about 1 to about 80% and preferably from about 5 to about 40% by weight of the compound to be reduced.

The amount of ammonia employed can vary within the range from about 20 to about 300 volume percent of the dinitrile, and preferably within the range from about 50 to about 100 percent by volume of the dinitrile. The ammonia functions as a suppressant, and suppresses the tendency of the already reduced amine to compete with hydrogen in adding to any partially reduced imine which may be present in the reaction mixture.

The nitrile reduction is effected at a temperature within the range from about 30 to about 200° C., and preferably within the range from about 50 to about 150° C., with vigorous agitation, in the presence of an excess of hydrogen. The hydrogen pressure can vary within the range from about 200 to about 20,000 p.s.i., and preferably within the range from about 1500 to about 7000 p.s.i.

The reaction is allowed to continue until absorption of hydrogen in the reaction mixture ceases. The actual reaction time can be within the range from about 1 to about 30 hours, and preferably from about 5 to about 15 hours.

The reduction of the ring-unsaturated cycloaliphatic dinitrile or diamine to the ring-saturated cycloaliphatic dinitrile or diamine is effected at a temperature up to about 250° C., and preferably within the range from about 50 to about 150° C., in the presence of the hydrogenation catalyst, while agitating and at a hydrogen pressure to complete the saturation of the double bond of the dinitrile or diamine. The amount of catalyst employed in the hydrogenation of the ring >C=C< can be within the range from about 0.1 to about 30%, and preferably is within the range from about 0.5 to about 10% by weight of the compound to be reduced. The hydrogen pressure employed to complete the saturation of the ring double bond should be within the range from about 50 to about 5000 p.s.i., and preferably from about 100 to about 2000 p.s.i.

The ring-unsaturated cycloaliphatic dinitriles which are reduced in accordance with the process of the invention can be prepared by the Diels-Alder condensation of 2-methylene aliphatic dinitriles with 1,3-dienes in accordance with the procedure described in copending application Ser. No. 617,042.

The 2-methylene aliphatic dinitriles employed are defined by the formula:

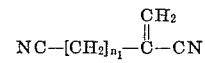

wherein $n_1$ is as defined hereinbefore, and the total number of carbon atoms in the dinitrile is five or six.

Exemplary of the aliphatic dinitriles falling within the above class are 2-methylene glutaronitrile and itaconodinitrile.

The 2-methylene dinitriles of the invention are known compounds, and are obtained using known procedures. Such procedures are described, for example, in French Pat. No. 138,844, Belgian Pat. No. 677,175, Belgian Pat. No. 677,265, French Pat. No. 1,411,003, British Pat. No. 1,018,220, and Journal of Organic Chemistry 30 1357–60 (1965). Itaconotrile can be prepared by known methods from itaconic acid.

The 1,3-diene has the general formula

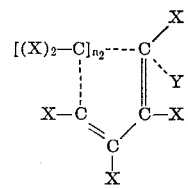

wherein X, Y and $n_2$ are as defined hereinbefore. Y is present only when $n_2$ is zero. Typical 1,3-dienes suitable for use in preparing the ring unsaturated cycloaliphatic dinitriles include butadiene, 2,3-dimethyl butadiene, 3-n-propyl hexadiene, isoprene, piperylene, cyclopentadiene, hexachlorocyclopentadiene, hexachlorobutadiene, α-vinyl-naphthalene, anthracene, chloroprene, 2-methoxybutadiene, fulvene, and dicyclopentadiene.

In the Diels-Alder condensation for preparing the ring-unsaturated cycloaliphatic dinitrile starting material, the 2-methylene aliphatic dinitrile is reacted with the 1,3-diene in a molar ratio of the dinitrile compound to the diene within the range from about 0.8:1 to about 1.2:1, and preferably 1:1. A large excess of either reactant can lead to the formation of undesirable by-products and thus should be avoided. The reaction can be carried out in the presence of an inert solvent or reaction medium, such as, for example, toluene, xylene, nitrobenzene, benzonitrile, and carbon tetrachloride. However, a solvent need only be employed if the 2-methylene aliphatic dinitrile and the 1,3-diene reactants are immiscible under reaction conditions.

In the Diels-Alder reaction of the 2-methylene aliphatic dinitrile with the 1,3-diene, the temperature of the reaction is maintained within the range from about 50 to about 200° C., and preferably from 110 to about 150° C. The reaction time should be within a range from about 0.25 to about 30 hours, and preferably from about 5 to about 15 hours. The desired product may be recovered from the resulting reaction product mixture by conventional procedures, such as distillation and/or crystallization.

The following examples in the opinion of the inventors represent preferred embodiments of their invention.

EXAMPLE 1

1-aminomethyl-1-(3-aminopropyl) cyclohexane was prepared by reduction of 1-cyano-1-(2-cyanoethyl)cyclohexene-3 in accordance with the following procedure.

About 2468 g. of 1-cyano-1-(2-cyanoethyl)cyclohexene-3, prepared in accordance with the procedure described in copending application Ser. No. 617,042, was dissolved in 2300 g. of absolute ethanol. About 494 g. of Raney cobalt, which had been washed with absolute alcohol to remove the water therefrom, was added to this mixture. The mixture was placed in a 4 gallon autoclave, purged with nitrogen and then with ammonia, and 3.4 lb. of liquid ammonia was pumped into the autoclave and the mixture heated to 80° C. Hydrogen then was introduced into the reactor to a hydrogen pressure of 4900 p.s.i. and the mixture was then well stirred at 80° C. with a "Dispersomix" stirrer at 1000 r.p.m. Additional hydrogen was pumped in as hydrogen was absorbed. The reaction was continued for 15 hours until absorption of hydrogen had ceased.

Thereafter, the temperature was allowed to fall to 30° C., the unreacted gases were purged and ammonia allowed to evaporate. The mixture was removed from the autoclave, filtered from the catalyst, and distilled.

Infra-red examination of the product showed that the nitrile groups were completely reduced to amine groups. After removal of solvent by distillation, about 5% of the mixture was distilled at 102–105° C. at 17 torr and was found to be 3-azo-spiro 5,5-undecane. The next fraction distilled over 142° C. at 14 torr. It was determined by nuclear magnetic resonance that this was a mixture of the corresponding saturated and unsaturated diamines, containing about 40% of the unsaturated diamine. The total yield (saturated and unsaturated diamines) was 77%.

The unsaturated diamine was then hydrogenated in the presence of the saturated diamine using palladium on a carbon carrier (Pd/C) containing 5% palladium, in an amount of about 7% by weight of the diamines, at a hydrogen pressure of 1000 p.s.i. and at 130° C. for approximately 12 hours. The final saturated product, identified as 1 aminomethyl-1-(3-aminopropyl)cyclohexane, had a boiling point of 113° C. at 3 torr, 114° C., at 4 torr and 160° C. at 8 torr and was recovered in a 75% yield.

Tablet I below tabulates the melting point, boiling point, yield in percent of theoretical, and microanalysis, namely, carbon, hydrogen, and nitrogen content of the starting materials and reaction products, including the calculated analysis (first line) and the actual analysis (second line). Identification of the product as 1-aminomethyl, 1-(3-aminopropyl)cyclohexane was confirmed by infra-red spectral analysis.

with 5% palladium on a carbon carrier (as used in Example 1) according to the following procedure.

The catalyst was employed in an amount of 2% by weight of the dinitrile. 0.5% glacial acetic acid was added to the dinitrile and catalyst mixture and the mixture was heated with stirring at 300 p.s.i. and 80° C. for about six hours. A substantially pure 1-cyano-1-(2-cyanoethyl)cyclohexane was isolated from the reaction product by distillation at 38 mm., at which pressure the boiling point was 202° C. A considerable amount of polymeric material was left in the residue.

About 3322 g. of the 1-cyano-1-(2-cyanoethyl)cyclohexane was dissolved in 3500 g. of absolute ethanol. About 454 g. of Raney cobalt, which had been washed with absolute alcohol to remove the water therefrom, was added to this mixture. The mixture was placed in a 4 gallon autoclave, purged with nitrogen and then with ammonia, and 5.8 lbs. of liquid ammonia was pumped into the autoclave and the mixture heated to 80° C. Hydrogen then was introduced into the reactor to a hydrogen pressure of 3800 p.s.i. and the mixture was then well stirred at 80° C. with a "Dispersomix" stirrer at 1000 r.p.m. Additional hydrogen was pumped in as hydrogen was absorbed. The reaction was continued for 15 hours until absorption of hydrogen had ceased.

Thereafter, the temperature was allowed to fall to 40° C., the unreacted gases were purged and ammonia allowed to evaporate. The mixture was removed from the autoclave, filtered from the catalyst, and distilled. A mixture of a saturated spirane and 1-aminomethyl-1-(3-aminopropyl)cyclohexane was recovered. The total yield of 1-aminomethyl-1-(3-aminopropyl)cyclohexane was about 72%.

EXAMPLE 3

1 - aminomethyl-1-(3-aminopropyl)-4-ethyl-5-n-propyl-cyclohexane is prepared by reduction of 1-cyano-1-(2-cyanoethyl)-4-ethyl-5-n-propyl-cyclohexene-3 in accordance with the following procedure.

3-n-propyl hexadiene-1,3 is added to 2-methylene glutaronitrile in equal volume. About 6 ml. of this mixture is introduced into a 10 ml. valved stainless steel reactor containing 0.0005 g. of p-tertiarybutyl catechol. The contents of the reactor are agitated and the reactor is then placed in an oil bath at 140° C. for about 20 hours. After cooling, the mixture is removed and distilled under re-

TABLE I.—PHYSICAL PROPERTIES AND ANALYTICAL DATA

| Compound No. | M.P., °C. | B.P., °C./ torr | Yield in percent of theoretical | Percent Microanalysis: (calculated) (actual) | | | Neutral equivalents: (calculated) (actual) |
|---|---|---|---|---|---|---|---|
| | | | | C | H | N | |
| 1-cyano-1-(2-cyanoethyl)-cyclohexene-3 | 29.7 | 149/3 | 56.3 | {75.00 {74.87 | 7.50 7.55 | 17.50 17.49 | |
| 1-cyano-1-(2-cyanoethyl)-cyclohexane | 28–29 | 223/38 | 55.9 | {74.03 {74.20 | 8.69 8.87 | 17.26 17.08 | |
| 1-aminomethyl-1-(2-aminoethyl)-cyclohexene-3 [1] | | 116/4 | 76.9 | {71.37 {70.74 | 11.97 12.88 | 16.64 16.64 | |
| 1-aminomethyl-1-(3-aminopropyl)-cyclohexane | | 160/8 | 75.0 | {70.52 {70.43 | 13.02 12.96 | 16.45 16.45 | 85.2 85.1 |
| 3-aza-spiro 5.5.undecene [1] | | 122/35 | ≐5 | | | | {152.0 {152.2 |
| 3-aza-spiro 5.5.undecane | | 100/15 | ≐5 | {78.36 {78.27 | 12.49 12.45 | 9.13 8.96 | |

[1] About 40% unsaturated.

EXAMPLE 2

The 1-cyano-1-(2-cyanoethyl)cyclohexene-3 in admixture with the corresponding cyclohexane prepared in accordance with the procedure described in copending application Ser. No. 617,042 was isolated from the reaction mixture by adding two volumes of toluene to the crude reaction mixture. A polymeric gum was thereby precipitated which was believed to be a copolymer of 2,4-dicyanobutene-1 and butadiene. The toluene solution was then distilled to isolate the unsaturated dinitrile, that is 1-cyano-(2-cyanoethyl)-cyclohexene-3 and the corresponding cyclohexane. The dinitrile was then hydrogenated duced pressure yielding 1-cyano-1-(2-cayonethyl)-4-ethyl-5-n-propyl cyclohexene in admixture with the corresponding cyclohexane.

About 3 g. of the aforementioned mixture is dissolved in 50 g. of absolute ethanol. About 5 g. of Raney cobalt, which has been washed with absolute alcohol to remove the water therefrom, is added to this mixture. The mixture is placed in a 250 ml. autoclave, purged with nitrogen and then with ammonia, and 35 g. of liquid ammonia is pumped into the autoclape and the mixture heated to 80° C. Hydrogen is introduced into the reactor to a hydrogen pressure of 4500 p.s.i. and the mixture is well stirred at 80° C. with a "Magnadash" stirrer at 1000 r.p.m. Additional hydrogen is pumped in as hydrogen is absorbed. The reaction is continued for 15 hours until absorption of hydrogen ceases.

Thereafter, the temperature is allowed to fall to 40° C., the unreacted gases purged and ammonia allowed to evaporate. The mixture is removed from the autoclave, filtered from the catalyst, and distilled.

Infra-red examination of the product shows that the nitrile groups are completely reduced to amine groups. It is determined by nuclear magnetic resonance that this is a mixture of the corresponding saturated and unsaturated diamines.

The unsaturated diamine is then hydrogenated in the presence of the saturated diamine using palladium on a carbon carrier (Pd/C) containing 5% palladium, in an amount of about 7% by weight of the diamines, at a hydrogen pressure of 500 p.s.i. and at 130° C. for 8 hours. The final saturated product is 1-aminomethyl-1-(3-aminopropyl)-4-ethyl-5-n-propyl cyclohexane.

EXAMPLE 4

Bicyclo [2.2.1]-2-aminomethyl-2-(3-aminopropyl)heptane is prepared by reduction of bicyclo [2.2.1]-2-cyano-2-(2-cyanoethyl)heptene-5 in accordance with the following procedure.

Bicyclo [2.2.1]-2-cyano-2-(2-cyanoethyl)heptene-5 is prepared as follows.

About 75 ml. of 2-methylene glutaronitrile and 47 ml. of freshly distilled cyclopentadiene are introduced into a 200 ml. stainless steel pressure reactor, the system purged with nitrogen, closed by means of a valve, and heated in an oil bath at 150° C. for 16 hours. The reaction mixture is distilled through a jacketed 10 cm. Vigreux column and yields bicyclo [2.2.1]-2-cyano-2-(2-cyanoethyl)heptene-5 having a melting point of 43–46° C.

About 20 g. of the bicyclo [2.2.1]-2-cyano-2-(2-cyanoethyl)heptene-5 are dissolved in 40 g. of absolute ethanol. About 10 g. of Raney cobalt, which has been washed with absolute alcohol to remove the water therefrom, is added to this mixture. The mixture is placed in a 250 ml. autoclave, purged with nitrogen and then with ammonia, and 40 g. of liquid ammonia are pumped into the autoclave and the mixture heated to 80° C. Hydrogen then is introduced into the reactor to a hydrogen pressure of 4000 p.s.i. and the mixture is then well stirred at 80° C. with a "Magnadash" stirrer at 1000 r.p.m. Additional hydrogen is pumped in as hydrogen is absorbed. The reaction is continued for 15 hours until absorption of hydrogen ceases.

Thereafter, the temperature is allowed to fall to 40° C., the unreacted gases are purged and ammonia allowed to evaporate. The mixture is removed from the autoclove, filtered from the catalyst, and distilled.

Infra-red examination of the product shows that the nitrile groups are reduced to amine groups. It is determined by nuclear magnetic resonance that this is a mixture of the corresponding saturated and unsaturated diamines.

The unsaturated diamine is then hydrogenated in the presence of the saturated diamine using palladium on a carbon carrier (Pd/C) containing 5% palladium, in an amount of about 7% by weight of the diamines, at a hydrogen pressure of 1000 p.s.i. and at 130° C. for 10 hours. The final saturated product is bicyclo [2.2.1]-2-aminoethyl-2-(3-aminopropyl)heptane.

The cycloaliphatic diamines of the invention can be employed for the preparation of alkyl diisocyanates which can be reacted with glycols to form polyurethanes, employing conventional techniques. It is well known in the art that polyurethanes can be prepared by reaction of a glycol with an aliphatic or aromatic diisocyanate. For example, Perlon U polyurethane can be made by reacting tetramethylene glycol and hexamethylene diisocyanate according to the equation

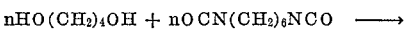

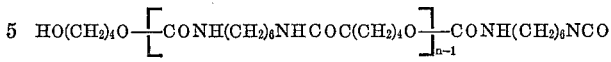

Aromatic diisocyanates because of their availability have been employed in the preparation of polyurethanes. However, the polyurethanes prepared employing the aromatic diisocyanates tend to discolor rapidly, more so than do such polyurethanes prepared employing the aliphatic diisocyanates. The alkyl diisocyanates produced from the cycloaliphatic diamines of the invention have been found to be less volatile than the aliphatic diisocyanates heretofore employed in preparing polyurethanes and therefore less hazardous in handling. Furthermore, polyurethanes produced by reacting such alkyl diisocyanates with glycols have been found to discolor much more slowly than do those produced by reacting aromatic diisocyanates with glycols. Accordingly, the alkyl diisocyanates are especially useful in the preparation of polyurethanes. For example, 1 - aminonmethyl-1-(3-aminopropyl)-cyclohexane of the invention can be reacted with phosgene to produce 1-(isocyanatomethyl) - 1-(3-isocyanatopropyl)cyclohexane which can be reacted with glycols in accordance with procedures well known to those skilled in the art to produce polyurethanes. During the reduction of the dinitrile to the corresponding diamine, a spirane by-product having the following structure can be formed and isolated:

This spirane is known as 3 aza-spiro 5.5.undecane which can have utility as a base for bactericides.

The following example illustrates the use of the cycloaliphatic diamines of the invention in preparing alkyl diisocyanates which are employed in preparing polyurethanes.

EXAMPLE 5

About 25 g. of the 1-(aminomethyl)-1-(3-aminopropyl)-cyclohexane of Example 1 was dissolved in about 75 ml. of methanol and anhydrous hydrogen chloride was bubbled into the solution for about 2.5 hours while the solution was maintained at from about 20 to about 25° C. by means of a cooling bath. The hydrogen chloride was added until somewhat more than the theoretically required weight had been added for formation of the dihydrochloride. No solid precipitated during the addition. About 35.7 g. of the solid hydrochloride was isolated by distilling off the methanol. The final traces of methanol were removed by azeotropic distillation with benzene.

About 30.4 g. (0.125 mole) of the dihydrochloride was introduced into a 500 ml. flask equipped with a gas-inlet tube, stirrer, reflux condenser and thermometer along with 125 ml. of o-dichlorobenzene. The contents of the flask were heated at about 155° C. during which time phosgene at a rate of 60 cc./min. was introduced. The reaction was continued for about eight hours. At the end of this period, the flow of phosgene was discontinued and the flask was purged with nitrogen gas for about 15 minutes. The solution was cooled and was then subjected to fractional distillation under vacuum. The solvent was removed at 10 mm. of Hg pressure and the residue was distilled at 0.3 mm. of Hg. A 1-(isocyanatomethyl)-1-3-isocycanatopropyl-cyclohexane product was obtained as a color less liquid boiling at 118° C. at 0.3 mm. Hg.

Analysis of the product by titration with dibutyl-amine showed that the product was 98.3% pure. The structure of the product was confirmed to be that of 1-(isocyanatomethyl) - 1 - (3-isocyantopropyl)-cyclohexane by mass spectroscopy, by infra-red analysis and by nuclear magnetic resonance. An analysis of the product for carbon, hydrogen and nitrogen gave the following results:

Found (percent): carbon, 65.05:64.96; hydrogen, 8.12:8.06; nitrogen, 12.57:12.60. Theoretical (percent): carbon, 64.82; hydrogen, 8.16; nitrogen, 12.60.

Inasmuch as 1-(isocyanatomethyl)-1-(3-isocyanatopropyl)-cyclohexane has a vapor pressure of 0.3 mm. Hg at 118° C. and it is substantially less volatile than known aromatic and aliphatic diisocyanates employed in the manufacture of polyurethanes and thus is substantially less hazardous to handle than the prior art aliphatic diisocyanates. The 1-(isocyanatomethyl)-1-(3-isocyanatopropyl) cyclohexane can be reacted with a glycol, for example, hexamethyleneglycol, in accordance with conventional techniques to produce a polyurethane which can be foamed according to conventional techniques and thereafter used for cushions or mattresses. Further, the cycloaliphatic diamines of the invention can be reacted with an acid, for example, adipic acid, or an acid chloride, to form a polyamide employing conventional polyamide preparatory techniques. The polyamides thereby formed are useful as fibers, for example, for wearing apparel.

The following example illustrates the preparation of a polyurethane employing 1-(isocyanatomethyl)-1-(3-isocyanatopropyl)cyclohexane produced from the corresponding diamines of the invention.

EXAMPLE 6

About 5 g. of 1-(isocyanatomethyl)-1-(3-isocyanatopropyl)cyclohexane of Example 5, 20 ml. of dry pyridine catalyst and 16 g. of polyoxypropylene glycol, molecular weight of 400-2000, are stirred together and slowly heated to 140° C. in a polymerization reactor, and thereafter heated at 145° C. for an additional nine hours. A pinkish clear plastic material is produced, which is molded in a press at about 150° C. to produce a clear flexible film. Further heating of this film at 160°-170° C. in the presence of atmospheric moisture for 20 hours produces an infusible, xylene- and dimethylformamide-insoluble material.

Having regard to the foregoing disclosure, the following is claimed as the inventive and patentable embodiment thereof:

1. Cycloaliphatic di(aminoalkanes) having the formula

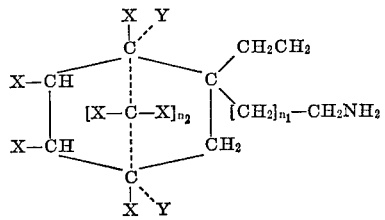

wherein X and Y are selected from the group consisting of hydrogen, halogen, alkyl having from about one to about twelve carbon atoms, alkylene having from about one to about twelve carbon atoms, and alkoxy having from about one to about twelve carbon atoms, $n_1$ is one or two, $n_2$ is an integer from zero to about three and Y is present only when $n_2$ is zero, and wherein two adjacent X groups can be taken together to form an alkylene group having from about three to about six carbon atoms.

2. Cycloaliphatic di(aminoalkanes) in accordance with claim 1 having the formula

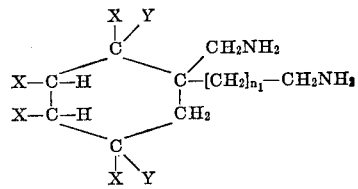

wherein X, $n_2$ and $n_3$ are as defined in claim 1.

3. Cycloaliphatic di(aminoalkanes) in accordance with claim 1 having the formula

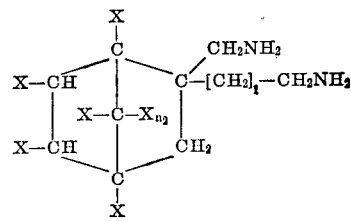

wherein X, $n_1$ and $n_2$ are as defined in claim 1.

4. 1-aminomethyl-1-(3-aminopropyl)cyclohexane.

References Cited

UNITED STATES PATENTS

| | | | |
|---|---|---|---|
| 3,260,752 | 7/1966 | Miller et al. | 260—583 |
| 3,352,913 | 11/1967 | Schmitt et al. | 260—563 |
| 3,408,397 | 10/1968 | Feldman et al. | 260—583 |

CHARLES B. PARKER, Primary Examiner

D. R. PHILLIPS, Assistant Examiner

U.S. Cl. X.R.

260—2.5, 77.5, 453, 293, 340.3, 343.2, 343.3, 346.2, 50.5